United States Patent [19]

Thissen et al.

[11] 4,319,949
[45] Mar. 16, 1982

[54] MACHINE FOR HEAT SEALING POLYMERIC SHEETS INTO A SPIRAL DRUM

[75] Inventors: Christopher P. Thissen; Jerry J. Ferwerda; Milford J. Tweet; Ronald D. Hatfield, all of Austin, Minn.

[73] Assignee: Walker Process Corporation, Aurora, Ill.

[21] Appl. No.: 168,732

[22] Filed: Jul. 14, 1980

[51] Int. Cl.³ ........................................... B32B 31/00
[52] U.S. Cl. .................................. 156/446; 156/184; 156/499
[58] Field of Search ............... 156/184, 187, 195, 190, 156/191, 425, 447, 448, 446, 457, 458, 499

[56] References Cited

U.S. PATENT DOCUMENTS

| | | | |
|---|---|---|---|
| 969,715 | 9/1910 | Miller | 156/457 |
| 2,826,238 | 3/1958 | Schmidt | 156/457 |
| 3,086,625 | 4/1963 | Wyatt | 156/190 X |
| 3,131,107 | 4/1964 | Dole et al. | 156/446 X |
| 3,300,355 | 1/1967 | Adams | 156/446 X |
| 3,400,029 | 9/1968 | Mesrobian et al. | 156/190 X |
| 3,567,504 | 3/1971 | Hopkins et al. | 156/184 X |

*Primary Examiner*—David A. Simmons
*Attorney, Agent, or Firm*—Merriam, Marshall & Bicknell

[57] ABSTRACT

A heat sealing machine for producing a drum of spirally wound layers of thermoplastic polymeric sheet material heat sealed together having a rotatable horizontal shaft for receiving thermoplastic polymeric sheet material spirally wound thereon by rotation of the shaft; a heater adapted to be positioned between and adjoining a first polymeric sheet layer being spirally wound on the shaft and a prior layer wound on the shaft; and a support, for the heater, displaceable with respect to the shaft axis so that the heater can remain radially adjacent a drum surface on which another spiral layer is to be heat sealingly attached. A portion of the heater can be readily formable into cylindrical shell segments of varying radii when positioned between the two polymeric sheet layers.

16 Claims, 8 Drawing Figures

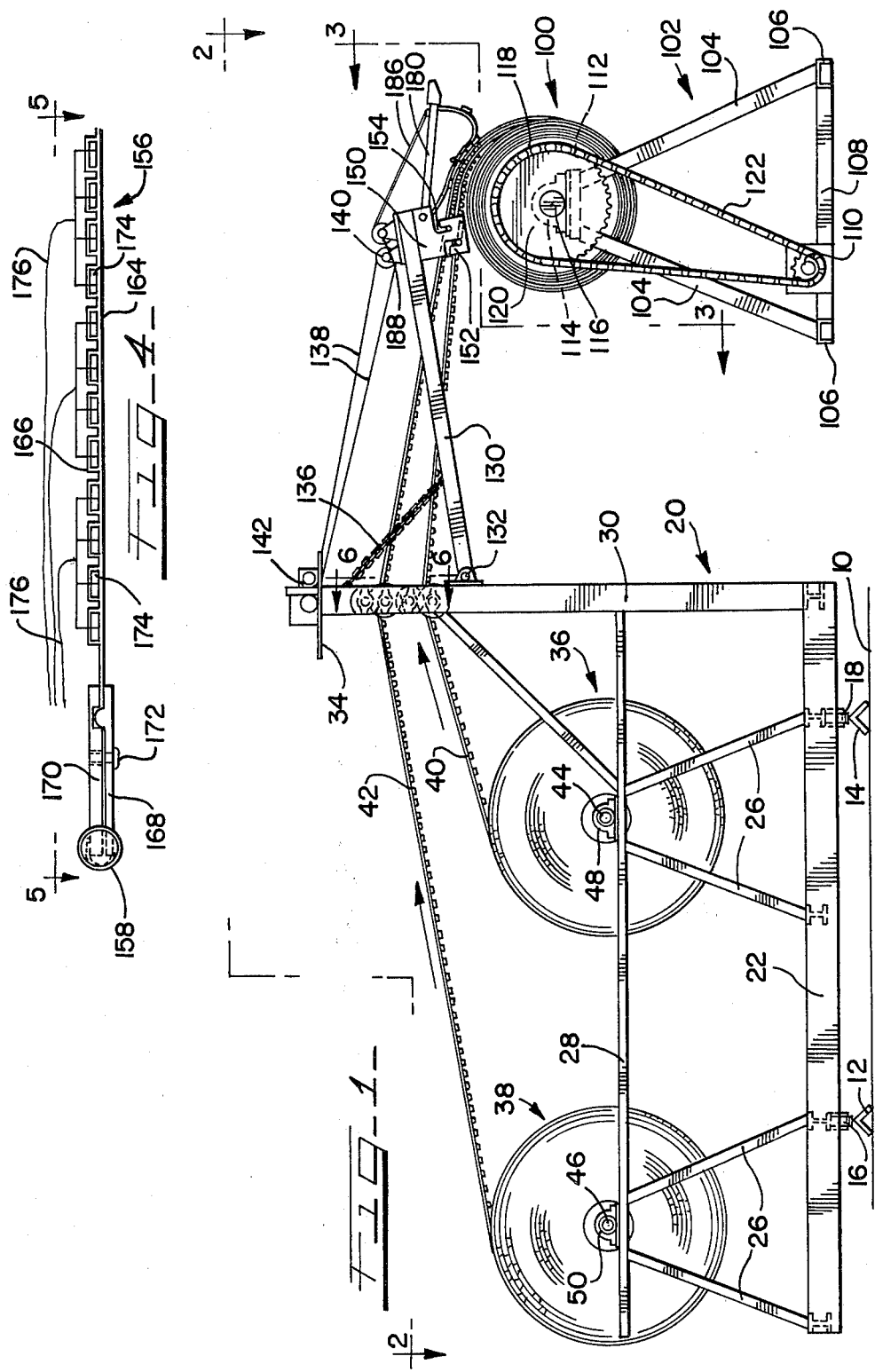

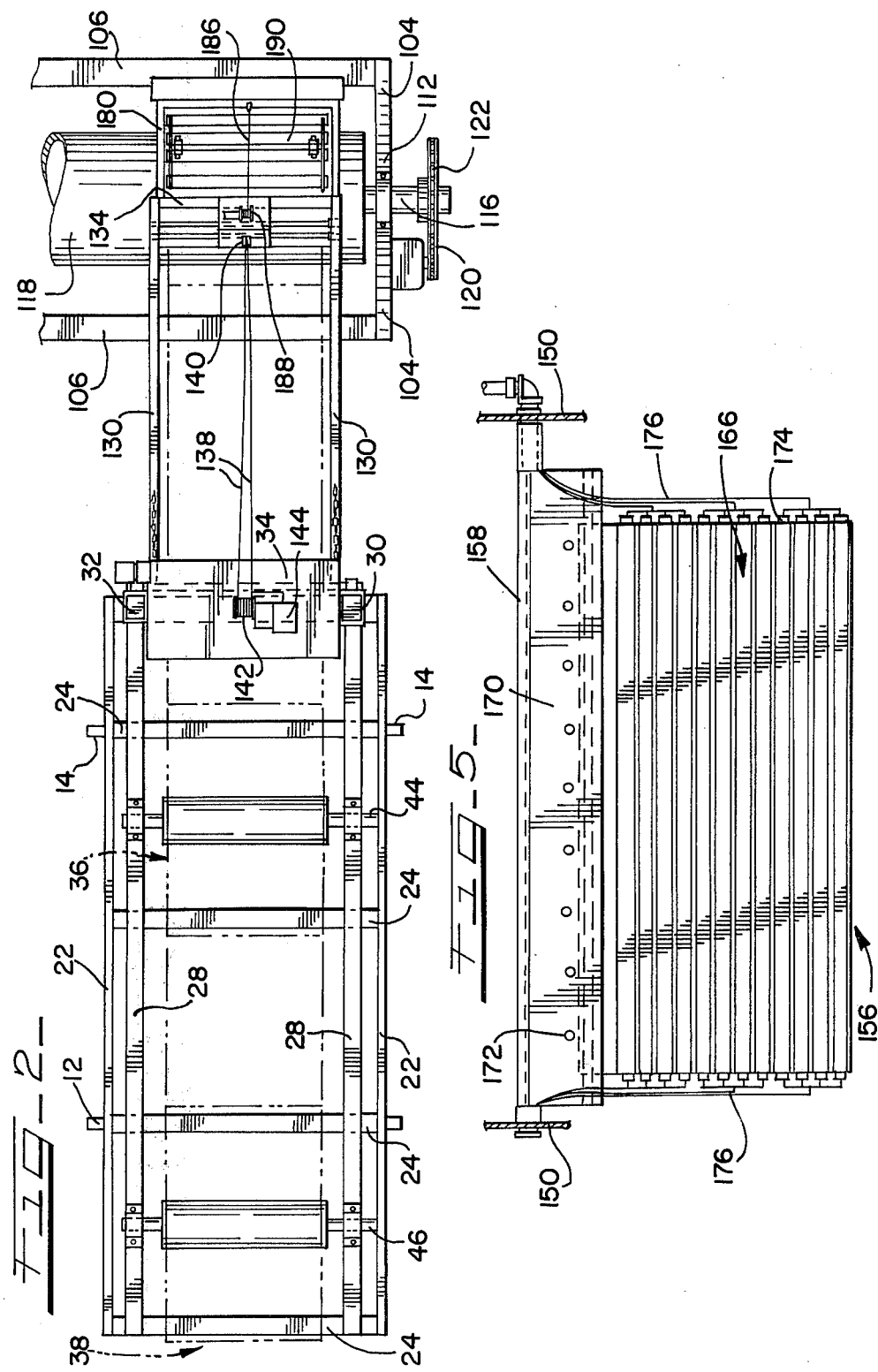

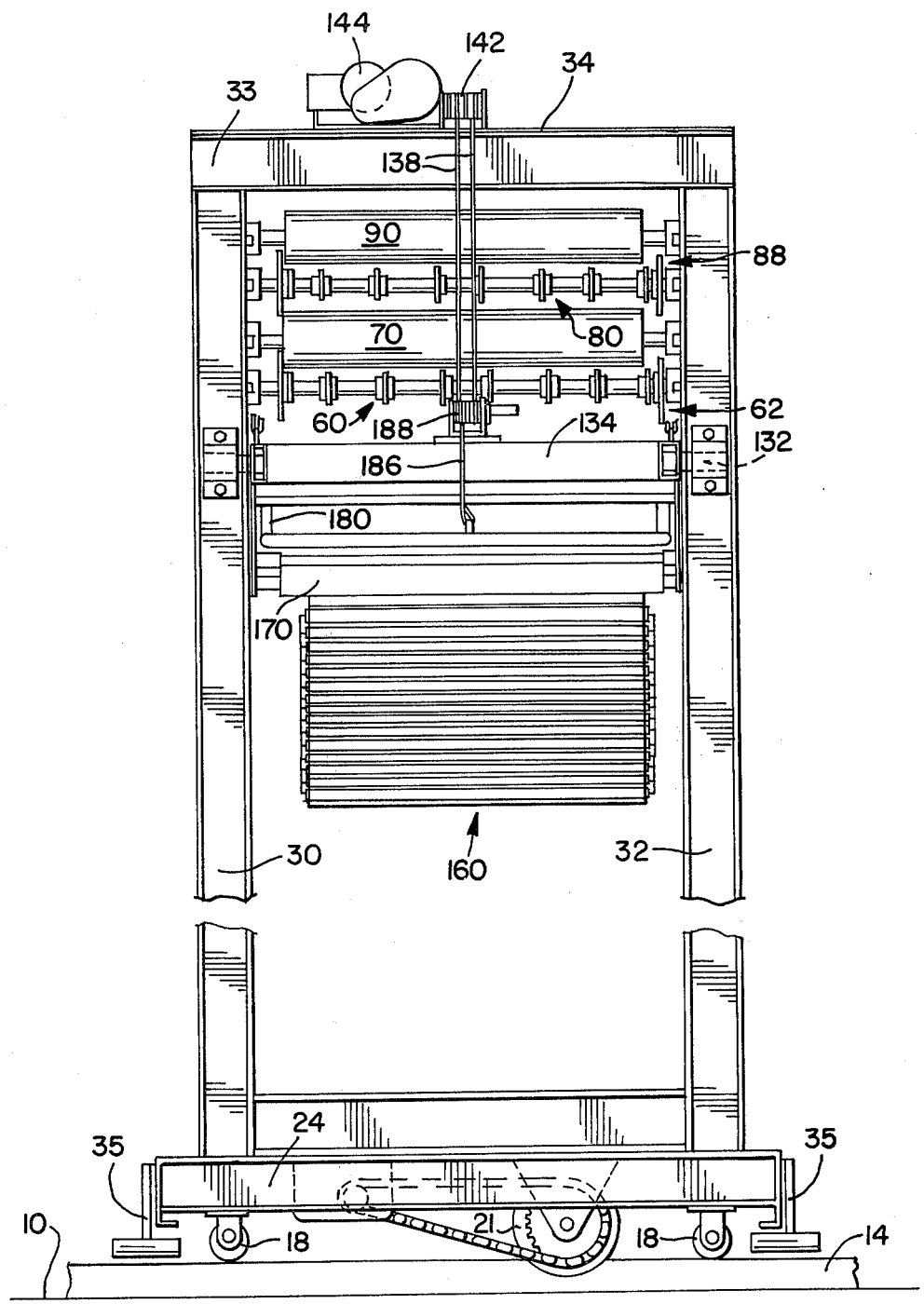
FIG_3

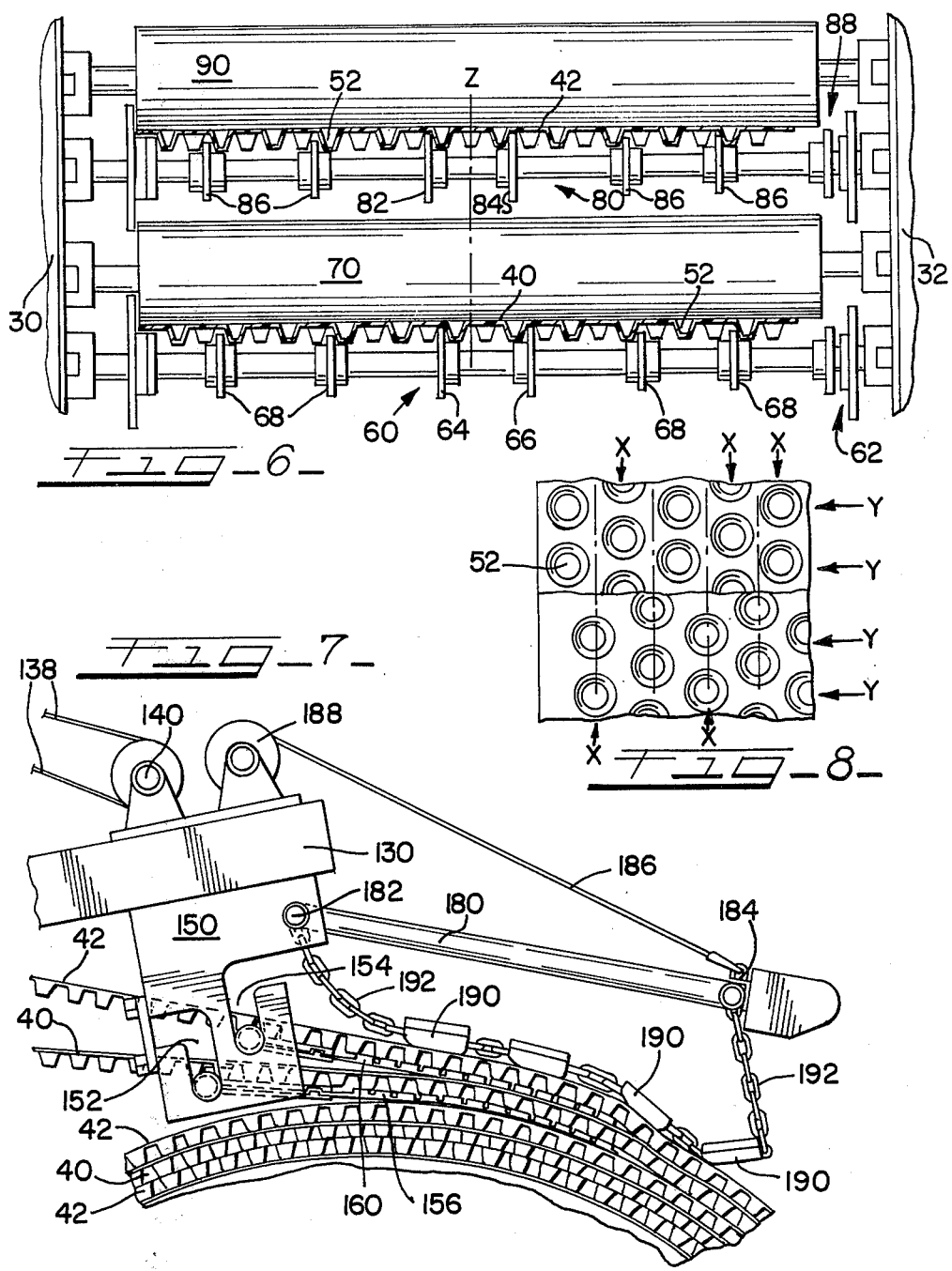

MACHINE FOR HEAT SEALING POLYMERIC SHEETS INTO A SPIRAL DRUM

This invention relates to heat sealing or welding polymeric sheet material. More particularly, this invention is concerned with apparatus for heat sealing together layers of polymeric sheet material spirally wrapped onto a shaft.

BACKGROUND OF THE INVENTION

Various types of rotating biological waste water contactors have been used to expose organisms to air to encourage their growth and thereby increase digestion of organic waste materials in water. Representative of such contactors are those disclosed in U.S. Pat. Nos. 3,827,559; 3,894,953; 3,904,525; 3,997,443; 4,083,746; and 4,115,268.

The rotors of the contactors are generally formed by placing discs side-by-side on a shaft, or by spirally wrapping a strip or sheet around a shaft as in U.S. Pat. No. 4,115,268. Various types of spacers are used to keep the discs spaced apart, as well as to maintain the spiral layers apart, and to increase the contact area. The spacers can be separate elements or they can be integrally formed in the discs or spirally wound strip or sheet.

The environment in which the rotors are used is highly corrosive. Because of this, the large size of the rotors and the large number of them needed in waste water treatment plants, it is advisable to make them of an inert, tough, and inexpensive material which can be readily shaped and assembled into the rotors. Commercially available polymeric materials such as polyethylene, polypropylene and polystyrene are representative of those which can be used.

Thissen U.S. Pat. Nos. 4,115,268 and 4,083,746 disclose vacuum thermoforming three dimensional geometrical shapes into thermoplastic polymeric sheet material to thereby form integral spacers in the sheet and the subsequent forming of disc rotors and spiral rotors therefrom. The U.S. Pat. No. 4,115,268 in column 4, line 61 to column 5, line 2, discloses that the spirally wound strip or sheet can be welded together by the use of a heating bar simultaneously engaging the underlying turn of sheet plastic and the bottoms of cup-shaped recesses of a new turn of plastic being applied. It is also stated there that electronic welding can be used. The patent, however, does not disclose how the heat sealing or welding can be done as a continuous operation, nor does it disclose how to apply heat uniformly over an extended area of plastic sheet surfaces to be joined together by a heat seal or welding.

SUMMARY OF THE INVENTION

According to one aspect of the invention, there is provided a heat sealing machine for producing a drum or rotor of spirally wound layers of thermoplastic polymeric sheet material heat sealed together comprising a rotatable horizontal shaft for receiving thermoplastic polymeric sheet material spirally wound thereon by rotation of the shaft; a heater means adapted to be positioned between and adjoining a first polymeric sheet layer being spirally wound on the shaft and a prior layer wound on the shaft; and support means, for the heater means, displaceable with respect to the shaft axis so that the heater means can remain radially adjacent a drum surface on which another spiral layer is to be heat sealingly attached.

Desirably, at least a portion of the heater means can be made readily formable into cylindrical shell segments of varying radii when positioned between the two polymeric sheet layers. For this purpose, the heater means can be non-rigid or flexible.

To wrap two layers simultaneously, the support means can hold a second heater means positioned to be outwardly from, but substantially parallel to, the other heater means, and to be located between the first polymeric sheet layer and a second polymeric sheet layer.

The support means for the heater can include a frame pivotal at one end about a horizontal axis parallel to the shaft, with the heater means being pivotally mounted to the other end. Means is desirably included to rotate the frame upwardly as the radius of a drum or rotor formed on the shaft increases.

The support means can include pressure applying means which can press a heated polymeric sheet against a layer therebeneath to facilitate thermoplastic bonding thereto. The pressure applying means can comprise weights which press by gravity, or a roller similarly operated. Power driven pressure applying means can also be used. In addition, the pressure applying means can include means to vary the area to which the pressure applying means applies pressure to the heated polymeric sheet.

The heat sealing machine is desirably provided with power driven means to rotate the shaft so that sheet material is wound on the drum at a substantially constant linear speed.

The heat sealing machine generally performs best when it includes power driven means to rotate the shaft, and brake means which can apply a restrictive force, opposing winding of a polymeric sheet on the rotating shaft, by developing tension in the polymeric sheet between the brake means and the shaft. The brake means can include two opposing rolls having parallel horizontal axes positioned to contact the opposite sides of a polymeric sheet to be wound onto the rotating shaft, with one of said rolls constituting a braking roll having means to resist rotation when the polymeric sheet is pulled between said two rolls. Specifically, the braking roll can have peripheral teeth adapted to engage the polymeric sheet.

The heat sealing machine desirably includes at least one guide roll to align the polymeric sheet as it is pulled by the rotating shaft for winding thereon.

The heat sealing machine should also have one or more rack means for receiving and supporting a feed roll of thermoplastic sheet material to be spirally wound on the shaft and heat sealed together.

BRIEF DESCRIPTION OF THE DRAWINGS

FIG. 1 is a side elevational view of a heat sealing machine provided by the invention;

FIG. 2 is a plan view of the heat sealing machine taken along the line 2—2 of FIG. 1;

FIG. 3 is a front elevational view of the heat sealing machine taken along the line 3—3 of FIG. 1;

FIG. 4 is an edge view of a flexible heater used in the heat sealing machine shown in FIGS. 1 to 3;

FIG. 5 is a plan view of the heater shown in FIG. 4 taken along the line 5—5 of FIG. 4;

FIG. 6 is a front elevational view taken along the line 6—6 of FIG. 1;

FIG. 7 is a side view of the heaters and supporting mechanism shown in FIG. 1; and FIG. 8 is a cut-away view of two layers of spirally wrapped thermoplastic polymeric material heat sealed together.

DETAILED DESCRIPTION OF THE DRAWINGS

With reference to FIGS. 1 to 3, the floor 10 supports a pair of parallel spaced apart tracks 12 and 14, formed of steel angles, on which two pair of rollers 16 and 18 run. The rollers 16 and 18 are mounted on the bottom of a framework 20. Framework 20 is moved along tracks 12 and 14, with rollers 16 and 18 in contact therewith, by power driven wheel 21 (FIG. 3). The framework 20 has lower horizontal members 22 and 24, legs 26, upper horizontal members 28 and two tall end columns 30 and 32. Beam 33 is joined to the top of columns 30 and 32 and horizontal plate 34 is mounted thereon. Lifting and locking mechanisms 35 raise rollers 18 from contact with tracks 12 and 14 and thereby secure framework 20 in any desired position on the tracks.

Two feed rolls 36 and 38 of previously formed thermoplastic polymeric sheet material 40 and 42 are supported on axles 44 and 46 in bearing mounts 48 and 50 attached to the top of horizontal members 28. Each feed roll 36 and 38 can comprise preformed sheet material such as is disclosed in Thissen U.S. Pat. No. 4,115,268 for making a rotor comprising a plurality of drums mounted on a shaft adjacent one another. Such a performed sheet material can be produced by vacuum thermoforming using the system disclosed in that patent or in the copending U.S. patent application Ser. No. 168,731 filed July 14, 1980, now U.S. Pat. No. 4,284,396 granted Aug. 18, 1981, of some of us, the disclosure of which is entirely incorporated herein by reference. Each of the preformed sheets 40 and 42, as shown in FIG. 8, has adjacent parallel columns X of truncated conical cavities 52. The cavities 52 in adjoining rows Y are positioned obliquely to one another so that the rows Y, which are perpendicular to the columns X, contain cavities 52 from every other column X.

Mounted on the upper part of columns 30 and 32 is a braking roll 60 having a hydraulically operated disc brake 62 which can vary the torque needed to rotate the braking roll 60. The brake pressure is set at a predetermined pressure gauge reading before the equipment is put in operation. Once the apparatus is operating, disc brake 62 usually needs no, or little, further adjustment although it can be adjusted hydraulically, if appropriate, to apply the desired resistance to forward movement of sheet 40.

Braking roll 60 contains a pair of toothed wheels 64 and 66 (FIG. 6) which are axially adjustable so that they contact sheet 40 between adjacent columns X of cavities 52. The teeth on wheels 64 and 66 provide positive engagement with sheet 40 and prevent its slipping, which could occur with smooth surfaced wheels because of the slippery surface possessed by many types of polymeric sheets.

Braking roll 60 also contains four axially adjustable guide wheels 68 which are positioned to contact sheet 40 between adjacent columns X of cavities 52. The guide wheels 68 contact the sides of cavities 52 but not the underside of the top sheet 40.

Freewheeling rotatable backup roll 70 is supported in bearing mounts on columns 30 and 32. Backup roll 70 is positioned so that its axis is parallel to braking roll 60, and so that the nip between the rolls 60 and 70 will permit the sheet 40 to run through the nip with engagement by toothed wheels 64 and 66. Either one or both of rolls 60 and 70 can be adjustably mounted so that the nip distance can be varied to accommodate sheets 40 of different thicknesses.

A braking roll 80 is positioned above backup roll 70, and a backup roll 90 is positioned above braking roll 80. Braking roll 80 contains two axially adjustable toothed wheels 82 and 84 like toothed wheels 64 and 66, and four guide wheels 86 like guide wheels 68. Braking roll 80 is provided with a hydraulically operated brake 88 like brake 62 on braking roll 60. The nip between rolls 80 and 90, which have parallel axes, provides enough clearance for sheet 42 to pass through and for toothed wheels 82 and 84 to engage the sheet without it slipping.

It is important to have the cavities 52 of sheet 40 offset one-half the width of two adjacent columns X of cavities 52 in sheet 42 so that the bottoms of the cavities 52 in sheet 42 will contact, and be sealed to, the smooth top surface of sheet 40. This arrangement is shown in FIG. 8. The desired spacing is achieved by having the wheels 82, 84 and 86 on roll 80 positioned from centerline Z (FIG. 6) whole number multiples of the width of cavity columns X plus one-half such width, and to have the wheels 64, 66 and 68 on roll 60 positioned from centerline Z whole number multiples of the width of cavity columns X. By spacing the sheets 40 and 42 as described, a drum or rotor 100 can be manufactured using sheets 40 and 42 of identical shape and structure. Every other layer in the rotor will be a sheet 40 with a layer of sheet 42 between each two adjacent sheets 40 but offset axially therefrom as described above.

As shown in FIGS. 1 and 2, support frame 102 comprises a pair of slanted legs 104 at each end joined at their lower ends to two spaced apart horizontal channel members 106. Channel members 108 extend between the opposing ends of members 106. Motor driven sprocket 110 is supported on one member 108.

A bearing base 112 is joined to the top of each pair of slanted legs 104 and a bearing mount 114 is joined to each bearing base 112. Each bearing mount receives a short axle 116 extending outwardly from the closed end of large metal tube or pipe 118 on which sheets 40 and 42 are heat sealingly wrapped. A large sprocket 120 is mounted on one axle 116 above small sprocket 110 and endless chain 122 is wrapped around the two sprockets to transfer power from small sprocket 110 to large sprocket 120 so as to slowly rotate tube 118 clockwise.

An arm 130 is pivotally joined to each column 30 and 32 by a pin 132. The outer ends of the two arms 130 are joined to the end of brace 134. Chain 136 extending from column 30 to the arm 130 joined to column 30 limits downward pivotal action of the arms 130.

A wire rope 138 extends from sheave 140 on brace 134 to a spool 142 on support plate 34. Wire rope 138 is wound on, and unwound from, spool 142 to raise and lower arms 130. Spool 142 is reversibly driven by a motor 144 through a speed reduction gear box so that the arms 130 are lifted slowly as rotor or drum 100 increases in diameter. A sensor, not shown, can be mounted beneath one arm 130 to actuate motor 144 by an appropriate electrical relay system when the sensor contacts rotor 100 so as to maintain a uniform distance between rotor 100 and arms 130 as the rotor diameter increases.

Extending downwardly from beneath the outer end of each arm 130 is a plate 150 having two J-shaped slots 152 and 154. A heater 156 is suspended by a pipe 158 having its ends positioned in the two slots 152. A second heater 160, identical to heater 156, is suspended in a similar manner in the two slots 154. Heater 156 is positioned on the surface of rotor 100 beneath the sheet 40 being applied thereto, and heater 160 is positioned between the two sheets 40 and 42 being wrapped and heat sealed together, and heat sealed to rotor 100.

With reference to FIGS. 4 and 5, each heater 156 and 160 has a smooth sheet metal side 164 and a corrugated or troughed side 166 removably joined together at each end. Pipe 158 is connected to one edge of the heater by plates 168 and 170 held together by bolts 172. A long thin resistance heating element 174 is positioned in each trough or corrugation in side 166. An electrical feed wire extends from each end of each heating element 174 and is directed back so as to run through a protecting conduit around the ends of pipe 158 to tie into an electric power circuit. The outer surfaces of each heater 156 and 160 is coated with polytetrafluroethylene (Teflon) to prevent it from sticking to heated sheets 40 and 42 and rotor 100.

The heaters 156 and 160 are temperature adjustable so as to provide sufficient heat to make the cavity 52 bottom surfaces plastic, or molten, and sticky so that upon contact with the sheet beneath it, it will stick firmly and sealingly thereto upon cooling to a solidifying temperature. The flexibility of the heaters 156 and 160, due to the corrugated side 166, permits each heater to assume a shape coinciding with the cylindrical surface of rotor 100 and the portion of sheets 40 and 42 being spirally wrapped thereon, even as the radius of the rotor increases. Although the drawings show corrugated side 166 placed upwardly or on top, it is at times desirable, and often preferable, to have the smooth side 164 positioned upwardly to provide a smooth surface on which the bottoms of the cavities 52 can slide. Each heater 156 and 160 can be turned over readily to place either side 164 or 166 on top.

An arm 180 is pivotally joined by a pin 182 to each of plates 150. An angle member 184 extends between, and is joined to, the outer ends of the two arms 180. Wire rope 186 is connected at one end to member 184 and the other end is wound onto a manually operable spool 188, although it can be driven by a motor.

A series of four heavy metal bars 190, parallel arranged, are flexibly connected together by chain links (FIG. 7). Short lengths of claim 192 extend from the outermost bars 190 to each end of the arms 180. By rotating spool 188 to wrap wire rope 186 on it, arms 180 are lifted thereby progressively and sequentially lifting the bars 190 from pressure bearing contact on the sheets 40 and 42 being heat sealed or welded together. When pressure over a greater area is desired, arms 180 are, of course, lowered to place more of the bars 190 in contact with a greater area of the sheets being wrapped on rotor 100.

Although the drawings illustrate the simultaneous spiral wrapping of two sheets 40 and 42 onto a rotor, it is feasible, according to the invention, to wrap a single sheet at a time, provided the single sheet does not contain three dimensional shapes or cavities in the surface which would prevent such wrapping, such as if the cavities unwantedly nest together during wrapping. When a single sheet is being wrapped only the heater 156, and only a single braking roll and backup roll, would be used.

The foregoing detailed description has been given for clearness of understanding only, and no unnecessary limitations should be understood therefrom, as modifications will be obvious to those skilled in the art.

What is claimed is:

1. A heat sealing machine for producing a drum of spirally wound layers of thermoplastic polymeric sheet material heat sealed together comprising:
    a rotatable horizontal shaft for receiving thermoplastic polymeric sheet material spirally wound thereon by rotation of the shaft;
    a heat means adapted to be positioned between and adjoining a first polymeric sheet layer being spirally wound on the shaft and a prior layer wound on the shaft;
    at least a portion of the heater means being readily formable into cylindrical shell segments of varying radii when positioned between the two polymeric sheet layers; and
    support means, for the heater means, displaceable with respect to the shaft axis so that the heater means can remain radially adjacent a drum surface on which another spiral layer is to be heat sealingly attached.

2. A heat sealing machine according to claim 1 including at least one guide roll with a radial flange to align the polymeric sheet between its side edges.

3. A heat sealing machine according to claim 1 in which the support means has a second heater means positioned to be outwardly from, but substantially parallel to, the other heater means, and to be located between the first polymeric sheet layer and a second polymeric sheet layer.

4. A heat sealing machine according to claim 1 in which the support means includes pressure applying means which can press a heated polymeric sheet against a layer therebeneath to facilitate thermoplastic bonding thereto.

5. A heat sealing machine according to claim 4 in which the pressure applying means comprises separate adjacent parallel weights which press by gravity.

6. A heat sealing machine according to claim 4 including means to vary the area to which the pressure applying means applies pressure to the heated polymeric sheet.

7. A heat sealing machine according to claim 1 including power driven means to rotate the shaft so that sheet material is wound on the drum at a substantially constant linear speed.

8. A heat sealing machine according to claim 1 in which the support means includes a frame pivotal at one end about a horizontal axis parallel to the shaft and having the heater means pivotally mounted to the other end.

9. A heat sealing machine according to claim 8 including means to rotate the frame upwardly as the radius of a drum formed on the shaft increases.

10. A heat sealing machine according to claim 1 including power driven means to rotate the shaft, and brake means which can apply a restrictive force, opposing winding of a polymeric sheet on the rotating shaft, by developing tension in the polymeric sheet between the brake means and the shaft.

11. A heat sealing machine according to claim 10 in which the brake means includes two opposing axially adjustable rolls having parallel horizontal axes positioned to contact the opposite sides of a polymeric sheet to be wound onto the rotating shaft, with one of said rolls constituting a braking roll having means to resist rotation when the polymeric sheet is pulled between said two rolls.

12. A heat sealing machine according to claim 11 in which the braking roll has peripheral teeth adapted to engage the polymeric sheet.

13. A heat sealing machine according to claim 10 including at least one guide roll to align the polymeric sheet as it is pulled by the rotating shaft for winding thereon.

14. A heat sealing machine according to claim 10 including a rack means for receiving and supporting a feed roll of thermoplastic sheet material to be spirally wound on the shaft and heat sealed together.

15. A heat sealing machine for producing a drum of spirally wound layers of thermoplastic polymeric sheet material heat sealed together comprising:

a rotatable horizontal shaft for receiving thermoplastic polymeric sheet material spirally wound thereon by rotation of the shaft;

a heater means adapted to be positioned between and adjoining a first polymeric sheet layer being spirally wound on the shaft and a prior layer wound on the shaft;

support means, for the heater means, displaceable with respect to the shaft axis so that the heater means can remain radially adjacent a drum surface on which another spiral layer is to be heat sealingly attached; and the support means including a frame pivotal at one end about a horizontal axis parallel to the shaft and having the heater means pivotally mounted to the other end.

16. A heat sealing machine according to claim 15 including means to rotate the frame upwardly as the radius of a drum formed on the shaft increases.

* * * * *

UNITED STATES PATENT AND TRADEMARK OFFICE
CERTIFICATE OF CORRECTION

PATENT NO. : 4,319,949
DATED : March 16, 1982
INVENTOR(S) : Christopher P. Thissen et al It is certified that error appears in the above-identified patent and that said Letters Patent are hereby corrected as shown below:

Column 3, line 28, change "per-" to --pre- --;

Column 6, line 10, change "heat" to --heater--.

Signed and Sealed this

Eighteenth Day of May 1982

[SEAL]

Attest:

GERALD J. MOSSINGHOFF

Attesting Officer

Commissioner of Patents and Trademarks